US005465617A

United States Patent [19]

Dudek et al.

[11] Patent Number: 5,465,617

[45] Date of Patent: Nov. 14, 1995

[54] INTERNAL COMBUSTION ENGINE CONTROL

[75] Inventors: Kenneth P. Dudek, Rochester Hills; Gregory P. Matthews, Bloomfield Hills; Charles H. Folkerts, Troy; Ronald A. Davis, Commerce Township, all of Mich.

[73] Assignee: General Motors Corporation, Detroit, Mich.

[21] Appl. No.: 217,824

[22] Filed: Mar. 25, 1994

[51] Int. Cl.[6] .................... G01M 15/00

[52] U.S. Cl. .................... 73/118.2; 73/3

[58] Field of Search .................... 73/3, 118.2

[56] References Cited

U.S. PATENT DOCUMENTS

| | | | |
|---|---|---|---|
| 4,594,987 | 6/1986 | Wataya et al. | 73/118.2 |
| 4,706,631 | 11/1987 | Wataya | 73/118.2 |
| 4,798,083 | 1/1989 | Sogawa | 73/118.2 |
| 4,986,244 | 1/1991 | Kobayashi et al. | 73/118.2 |
| 5,003,950 | 4/1991 | Kato et al. | 73/118.2 |
| 5,070,846 | 12/1991 | Dudek et al. . | |
| 5,086,745 | 2/1992 | Nishimura et al. | 73/118.2 |
| 5,211,056 | 5/1993 | Takamoto et al. | 73/118.2 |
| 5,228,336 | 7/1993 | Nagaishi | 73/118.2 |
| 5,270,935 | 12/1993 | Dudek et al. | 73/118.2 |
| 5,273,019 | 12/1993 | Matthews et al. . | |

*Primary Examiner*—Richard Chilcot
*Assistant Examiner*—Eric S. McCall
*Attorney, Agent, or Firm*—Michael J. Bridges

[57] ABSTRACT

Engine cylinder inlet air rate measurement is provided with minimization of system calibration and parameter measurement using a correction generated under steady state engine inlet air dynamic conditions through a comparison of mass airflow-based engine inlet air rate measurement and a nominal calculated cylinder inlet air rate. The correction may be periodically updated under steady state engine inlet air dynamic conditions and may be applied under all engine inlet air dynamic conditions, especially transient inlet air dynamic conditions.

8 Claims, 3 Drawing Sheets

INTERNAL COMBUSTION ENGINE CONTROL

INCORPORATION BY REFERENCE

U.S. Pat. No. 5,094,213 is hereby incorporated herein by reference.

1. Field of the Invention

This invention relates to internal combustion engine control and, more specifically, to engine cylinder inlet air rate measurement.

2. Background of the Invention

Internal combustion engine air/fuel ratio control is known in which the magnitude of a fuel command is determined in response to a prediction of the magnitude of an operator-controlled engine inlet air rate. If fuel is controlled to individual cylinders, such as through conventional port fuel injection, the corresponding inlet air rate to the cylinders must be predicted for each fuel injection event and the fuel command determined in response thereto to provide a desirable air/fuel ratio to the cylinders.

A desirable engine air/fuel ratio may be the well-known stoichiometric air/fuel ratio. Efficient reduction of undesirable engine exhaust gas constituents through conventional catalytic treatment thereof occurs when the engine air/fuel ratio is the stoichiometric ratio. Even minor deviations away from the stoichiometric ratio can degrade emissions reduction efficiency significantly. Accordingly, it is important that the engine air/fuel ratio be closely controlled to the stoichiometric ratio. An accurate cylinder inlet air rate measurement, estimation, or prediction is essential to such control.

Accurate cylinder inlet air rate prediction may be provided through application of generally known state estimation techniques, such as illustrated in U.S. Pat. No. 5,094,213, assigned to the assignee of this invention and incorporated herein by reference. Such a prediction should correspond to the actual cylinder inlet air rate precisely at the time fuel is to be injected thereto. The prediction relies on some combination of prior measurements of the cylinder inlet air rate, such as may come from a conventional mass airflow meter, or as may be derived through the well-known engine intake manifold absolute pressure-based speed density procedure.

As described in the disclosure of copending U.S. Ser. No. 08/155,263, filed Nov. 22, 1993, assigned to the assignee of this invention, a measurement of cylinder inlet air rate under steady state engine inlet air dynamics may be provided directly from a mass airflow meter. Typically, mass airflow meters are not well-suited to cylinder inlet air rate measurement during transient air dynamic conditions however, due to engine intake manifold filling or depletion and due to the typical significant time constant of such sensors. Known speed density approaches are better suited to application during such transient conditions, due to their fast response. However, speed density approaches are susceptible to bias errors from slowly changing parameters, such as altitude, temperature, and cylinder inlet air dilution from recirculated engine exhaust gas (EGR). The bias errors degrade the accuracy of the speed density approach, decreasing engine air/fuel ratio control precision, which can lead to reduction in exhaust gas catalytic treatment efficiency. Some limited success in reducing the effects of such slowly changing parameters has been made through time-consuming, detailed calibration procedures. Likewise, some limited success has been made through costly and often inaccurate measurement of such parameters and direct compensation for the effect of changes in such parameters. Nonetheless, such bias errors and the cost of present attempts to mitigate their effect persist as a shortcoming of conventional speed density approaches.

Accordingly, it would be desirable to compensate for bias errors in speed density estimation approaches to provide a more accurate cylinder inlet air rate measurement.

SUMMARY OF THE INVENTION

The present invention provides the desired benefit in speed density precision in vehicles having engine inlet airflow meters by incorporating absolute cylinder inlet air rate information into a volumetric efficiency correction to account for bias errors to which the speed density approach may be susceptible. The corrected volumetric efficiency then leads to a corrected cylinder inlet air rate measurement, such as may be applied in a prediction of cylinder inlet air rate at a future time.

Specifically, the present invention monitors engine inlet air dynamics and activates a correction term estimator when such dynamics are diagnosed as in a steady state characterized by a lack of manifold filling or depletion. When activated, the estimator updates a correction term in accord with a cylinder inlet air rate deviation. A nominal cylinder inlet air rate corresponding to speed density parameters under certain nominal conditions is combined with the mass airflow sensor-based cylinder inlet air rate to form the deviation. The deviation is thus a measure of the degree of operating condition variation away from the nominal conditions and may be applied as such in a correction of speed density measurements. The deviation may be updated periodically while under steady state air dynamic conditions to account for changes in such conditions as temperature, altitude and degree of inlet air dilution.

BRIEF DESCRIPTION OF THE DRAWINGS

The invention may be best understood through reference to the preferred embodiment and the drawings in which.

DESCRIPTION OF THE PREFERRED EMBODIMENT

Figure 1:
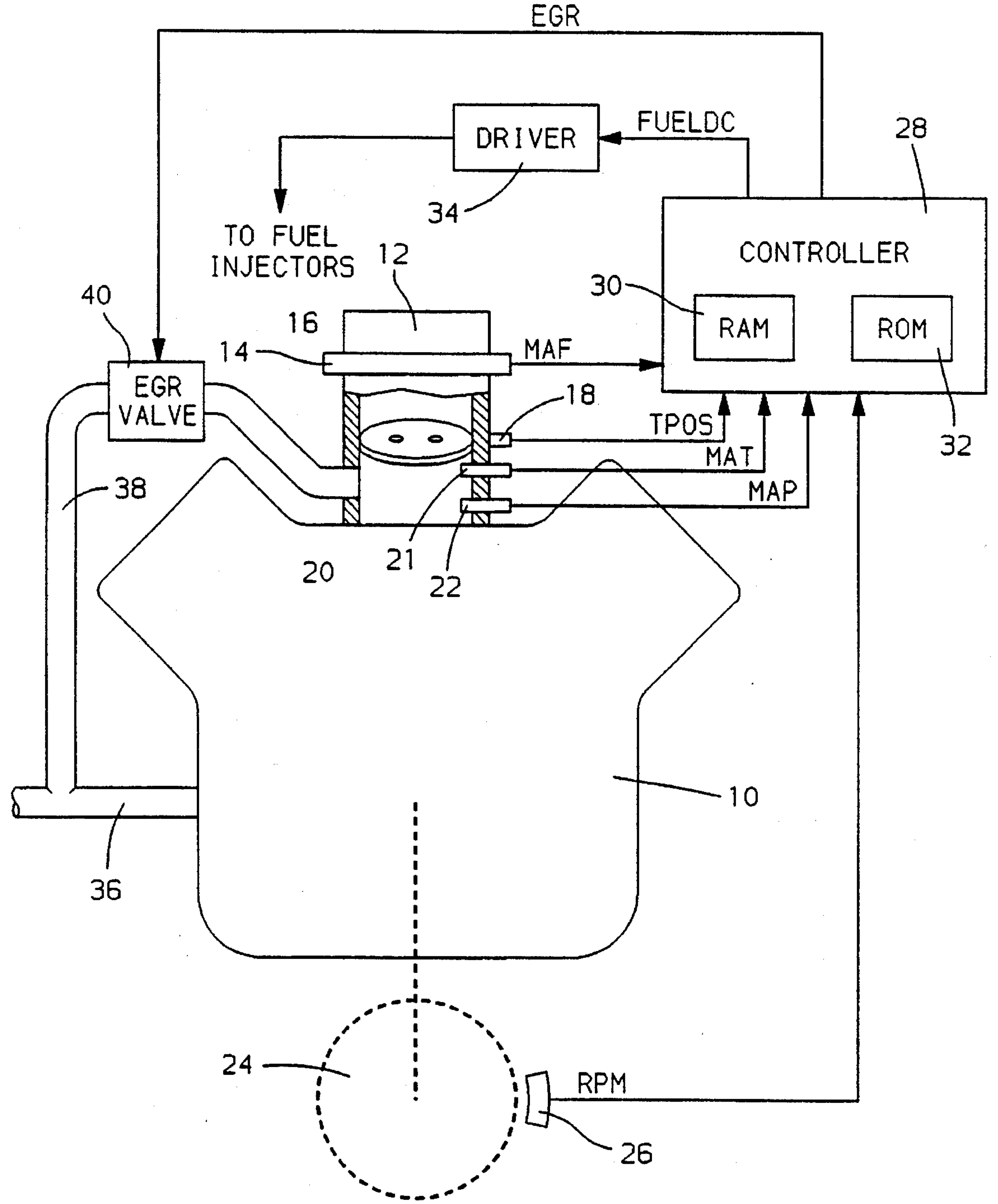
FIG. 1 is a general diagram of the hardware in which the preferred and alternative embodiments of this invention are carried out.

Referring to FIG. 1, air is provided to an internal combustion engine 10 through inlet air path commencing at inlet 12. The air passes from inlet 12 through mass airflow sensing means 14, such as a conventional mass airflow meter, which provides an output signal MAF indicative of the mass of air passing through the sensing means.

The inlet air is metered to the engine 10 via throttle valve 16, such as may be a conventional butterfly valve which rotates within the inlet air path in accord with an operator commanded engine operating point. The rotational position of the valve is transduced via throttle position sensor 18, which may be a generally known rotational potentiometer which communicates an output signal TPOS indicative of the rotational position of the valve 16.

A manifold pressure sensor 22 is disposed in the inlet air path such as in an engine intake manifold 20 between the throttle valve 16 and the engine 10, to transduce manifold absolute air pressure and communicate output signal MAP indicative thereof. A manifold air temperature sensor 21 is provided in the inlet air path such as in the engine intake manifold 20 to sense air temperature therein and communicate a signal MAT indicative thereof.

Combustion events occurring during engine 10 operation produce exhaust gasses passed out of engine 10 through exhaust gas conduit 36. A portion of the exhaust gasses is recirculated through EGR conduit 38 to the intake manifold 20. EGR valve 40, such as a commercially available electrically-controlled solenoid valve provides for metering of the recirculated exhaust gas through conduit 38 in response to an electrical command EGR from controller 28. The electrical command may be in the form of a pulse width modulated command wherein the solenoid valve remains open for the duration of each duty cycle of the command and otherwise is closed.

Engine output shaft 24, such as an engine crankshaft, rotates through operation of the engine 10 at a rate proportional to engine speed. Appendages or teeth (not shown) are spaced about a circumferential portion of the shaft 24 and rotate past tooth passage sensing means 26, such as a conventional variable reluctance sensor which communicates passage of the teeth in the form of output signal RPM. The teeth may be spaced about the circumference of the shaft 24 such that each passage of a tooth by the sensing means 26 corresponds to an engine cylinder event. For example, in a four cylinder, four stroke engine, the shaft 24 may include two teeth equally spaced about the shaft circumference, such as 180 degrees apart. Additional teeth may be included for synchronization of the teeth, as is generally understood in the engine control art.

Controller 28, such as a conventional 32 bit microcontroller, including conventional random access memory RAM 30 and conventional read only memory ROM 32, receives input signals including the described MAF, TPOS, MAP, MAT and RPM, and determines engine control commands in response thereto, to provide for control of engine operation, such as in a manner consistent with generally known engine control practices.

For example, the input information may be applied in an estimation of inlet air rate to the engine cylinders. The estimate may be applied to the predictor of the reference incorporated herein for prediction of the inlet air rate to the cylinders R steps ahead of the estimation time. The prediction approach described in the incorporated reference relies on an accurate estimate or measurement of the engine state to be predicted. Any inaccuracy in the estimation or measurement will inject inaccuracy into the resulting prediction. For example, an R-step ahead prediction of inlet air rate to the engine cylinders starts with some measurement or estimate of the cylinder inlet air rate. The prediction accuracy benefits from improved accuracy in the measurement or estimate. Alternatively, any inaccuracy in the measurement or estimate will lead to inaccurate engine air/fuel ratio control, which may increase engine emissions.

Beyond the prediction approach of the incorporated reference, any engine control approach responsive to a sensed, measured, estimated or predicted cylinder inlet air rate will benefit from increased accuracy. It is within the scope of the present invention to provide an accurate measurement of cylinder inlet air rate to be applied to any of such systems that may benefit from such described increased accuracy.

Figure 2:
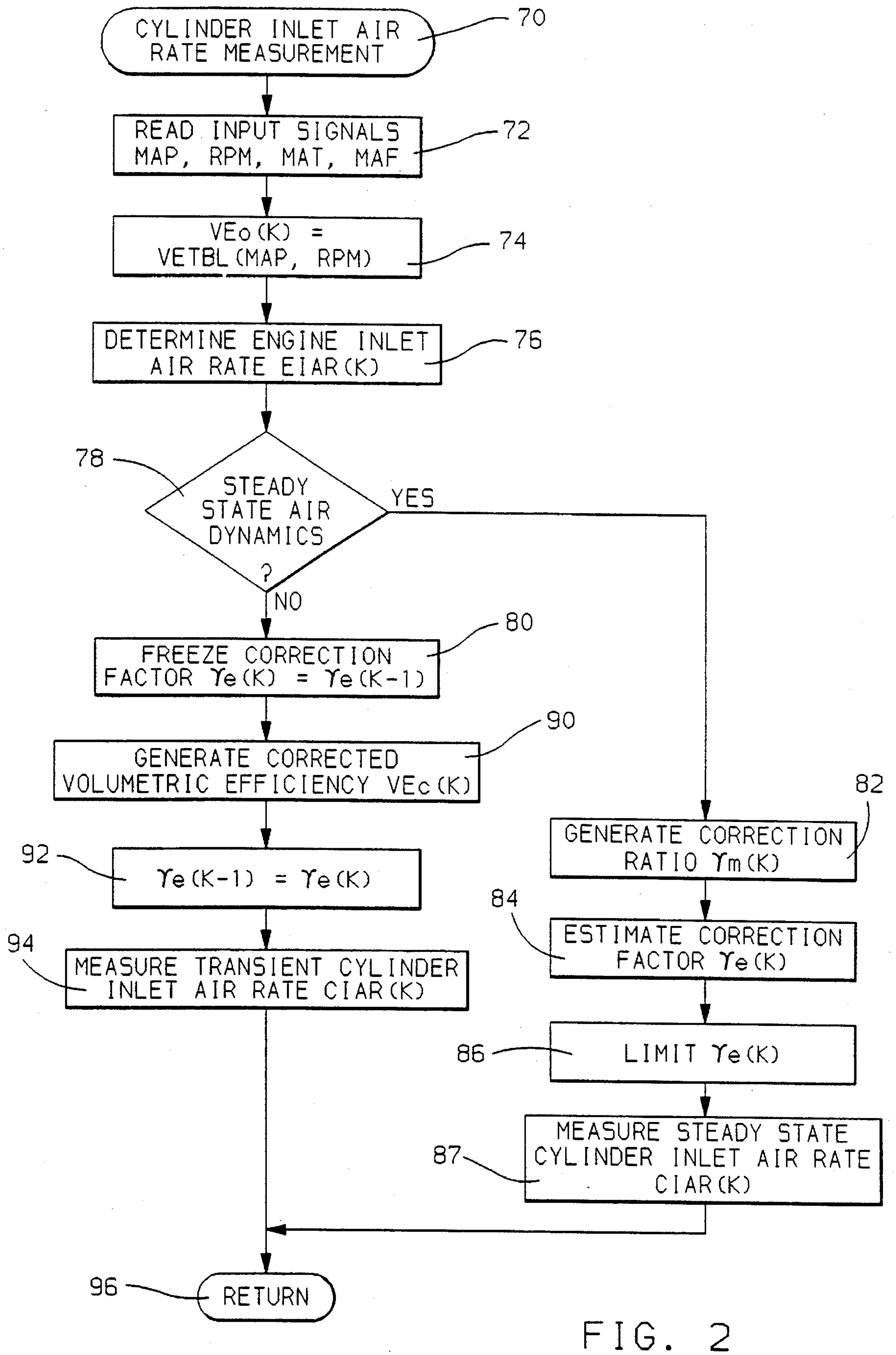
FIGS. 2–3 are computer flow diagrams illustrating the steps used to carry out this invention in accord with the preferred and alternative embodiments.

Returning to the preferred embodiment hereof, the step 110 of the incorporated reference requires a measurement or calculation of certain engine input parameters. In an embodiment of the invention of the incorporated reference in which cylinder inlet air rate is the parameter being predicted, the step 110 may require measurement of inlet air rate to the engine cylinders. In this embodiment, the measurement or estimation of inlet air rate to the engine cylinders is provided through step-by-step by-step execution of the operations of FIG. 2, starting at a step 70. FIG. 2 is iteratively executed, such as once per each engine cylinder event. For explanatory purposes, values corresponding to the present iteration may have the index k, and values from the most recent prior iteration may have the index k−1, etc. After starting at the step 70, the routine moves to a step 72, at which input signals are read by controller 28 (FIG. 1) and stored as corresponding values for this kth iteration including MAP(K), MAT(K), RPM(K), and MAF(K). The routine then moves to a step 74 to reference a nominal volumetric efficiency value VEo(K) as a function of stored input values MAP(K) and RPM(K).

For example, a nominal volumetric efficiency table VETBL may be generated through a vehicle calibration process in which volumetric efficiency is determined at each of a series of data points representing a corresponding series of paired RPM and MAP values. While the RPM and MAP vary with each data point in the table, other parameters are assumed to remain fixed through this calibration process. These other parameters include the fraction of EGR in the intake manifold, the temperature of air in the manifold MAT, and engine altitude. The assumption that such other parameters remain fixed through calibration greatly simplifies the calibration process, reduces the complexity of the process of referencing a VEo value, and yet, if applied with the corrections provided in accord with the present invention, does not reduce accuracy.

Returning to the present embodiment, VEo is referenced from the calibration table VETBL at the step 74 as the nominal volumetric efficiency value calibrated to correspond to RPM(K) and MAP(K), after which the engine inlet air rate EIAR(K) is determined at a step 76. EIAR(K) may be determined directly from measured mass airflow MAF input information, for example by integrating the MAF signal over a predetermined sample period such as the period between the kth and k−1th iterations of the present routine. The inventors intend that other known techniques for deriving an engine inlet air rate from engine parameter information may be used at the step 76 within the scope of this invention.

The routine then determines whether the engine inlet air dynamics may be characterized as steady state at a step 78. Preferably, the manner of making such a steady state determination is provided as described in the copending U.S. patent application, Ser. No. 08/155,263, filed Nov. 22, 1993, assigned to the assignee of this application. Generally, that copending application describes analysis of a number of samples of engine intake manifold absolute pressure MAP, or throttle position TPOS to determine whether manifold filling or depletion is occurring presently. If any such filling or depletion is occurring, or any other condition reducing the accuracy of the mass airflow sensing means as an indicator of cylinder inlet air rate, steady state is not present.

The present invention relies on the accuracy with which mass airflow information from mass airflow sensor 14 (FIG. 1) may be used to predict individual cylinder inlet air rate under steady state conditions. By the definition of steady state provided in the copending application Ser. No. 08/155,263, filed Nov. 22, 1993, assigned to the assignee of this application, when steady state conditions are determined to be present, reliable cylinder inlet air rate information is available using mass airflow information. Accordingly, a comparison may be drawn between the reliable cylinder inlet air rate information and calibration information, such as from the nominal value VEo(K). Unmodelled effects from such slowly changing parameters as ambient temperature, ambient pressure (such as changes with vehicle altitude) and degree of dilution from recirculated engine exhaust gas EGR may be exposed through the comparison. Difficult calibration for these effects may thus be avoided and costly or marginally accurate sensors or inaccurate estimators of such parameters or their effects may likewise be avoided.

A correction term may be generated from the comparison representing the effects of such parameters, and may be applied in subsequent cylinder inlet air rate estimation. As described, the cylinder inlet air rate estimate may be used as a measurement input for use in the R-step ahead predictor of the incorporated reference. The correction term is updated only when reliable cylinder inlet air rate information is available for comparison with calibration values, but may be applied to correct for effects not modelled in such calibration values at all times, including times when reliable cylinder inlet air rate information may not be available.

Furthermore, the inventors intend that more than one correction term may be available. For example, a series of cells may be defined each of which corresponds to a predetermined engine operating range and each of which has a dedicated correction term which is updated and applied only when the engine is operating in the corresponding operating range. Only one cell is active at any time, and the correction term for the active cell is updated according to a conventional update strategy, in response to the comparison between the nominal cylinder inlet air rate and the measured cylinder inlet air rate. The use of such cells and the manner in which the correction terms corresponding to each of such cells are updated, applied and stored is generally known in the engine control art, for example in the closed-loop engine air/fuel ratio control art to which the present invention pertains.

Returning to FIG. 2, if air dynamics are determined to be in steady state at the step 78, the routine moves to a step 82 to generate a correction ratio γm(K) as follows $$\gamma m(K)=EIAR(K)/(VEo(K)*MAP(K)/MAT(K)).$$

Thus in this embodiment, the correction ratio γm(K) is the ratio of measured cylinder inlet air rate from the mass airflow meter 14 (FIG. 1) under steady state conditions to the estimated cylinder air rate based on a calibrated nominal volumetric efficiency VEo(K). A correction factor γe(K) is next estimated at a step 84 through conventional filtering techniques applied to γm(K) as follows $$\gamma e(K)=\gamma e(K-1)+\alpha*(\gamma m(K)-\gamma e(K-1))$$

in which α is a weighting factor corresponding to a desired rate at which to update γe(K) with information on the degree of change of the correction ratio γe(K) from the prior estimated correction factor γe(K–1). For example, α may be set at 0.0625 in this embodiment. Next, γe(K) is limited at a step 86 to a predetermined reasonable correction range, such as between approximately 0.5 and 1.5.

The routine then moves to a step 87 to described steady state conditions from the engine inlet air rate EIAR(K) as determined at the step 76. For example, a conventional filtering process may be applied to EIAR(K) to generate CIAR(K) under the steady state conditions due to the described lack of significant manifold filling depletion. For example, in this embodiment, CIAR(K) may be generated according to the following lag filter process:

$$CIAR(K)=\beta*EIAR(K)+(1-\beta)*CIAR(K-1)$$

in which β is a well-known filter coefficient, set to 0.5 in this embodiment. After measuring CIAR(K) at the step 87, the routine moves to a step 96 to return to prior operations, such as the measurement of other parameters in accord with the description of the step 110 of the incorporated reference.

Returning to the step 78, if the air dynamics are determined to not be in steady state, the routine moves to a step 80 to freeze or hold the correction factor γe() constant, by assigning it the value γ(K–1) determined from the most recent execution of the routine of FIG. 2. In the present embodiment, if the air dynamics are not in steady state, the output signal MAF from the mass airflow meter 14 (FIG. 1) is assumed to not be a reliable measure of cylinder inlet air rate due mainly to engine intake manifold filling or depletion. As such, there is no measure of cylinder inlet air rate with which to correct the calibrated nominal volumetric efficiency value VEo(K) described at the step 74. However, it is during such non-steady state conditions that the correction provided by γe() is most valuable. Rather than rely on detailed calibration processes, or on expensive or only marginally accurate parameter measurement or estimation means, the γe() correction value adjusts for slowly changing parameters under non-steady state conditions, increasing speed density approach accuracy and overcoming many of the shortcomings commonly associated with speed density approaches.

After freezing the correction factor γe(K) at step 80, the routine moves to a step 90 to apply the correction factor to generate a corrected volumetric efficiency value VEc(K) as follows $$VEc(K)=\gamma e(K)*VEo(K).$$

The corrected volumetric efficiency thus accounts for physical effects of unmodelled parameter value fluctuations on the rate at which air passes into the engine cylinders, so as to better characterize the cylinder inlet air rate. Any physical effects that would cause a variation in cylinder inlet air rate manifold pressure would be accounted for in the correction of this embodiment.

The correction value γe(K) is next stored for the next iteration of the present routine as γe(K–1) at to determine an accurate measured cylinder inlet air rate CIAR(K) under the diagnosed non-steady state condition as follows $$CIAR(K)=VEc(K)*MAP(K)/MAT(K).$$

This measured cylinder inlet air rate may be applied as the measurement of the cylinder inlet air state to be predicted in the R-step ahead approach of the incorporated reference, as described. After the step 94, the routine of FIG. 2 returns to prior operations via the described step 96.

Turning to an alternative embodiment within the scope of this invention, a direct measure or estimate of quantity of recirculated engine exhaust gas EGR passing into the engine intake manifold may be available. For example, a conventional pressure difference sensor (not shown) may be disposed across the EGR valve 40 (FIG. 1) in position to provide an output signal ΔPegr indicative of the pressure drop across the valve 40 of known orifice size. The ΔPegr signal may be monitored over a predetermined time period to determine ΔPegr(K), the quantity of EGR passing through EGR conduit 38 (FIG. 1) into intake manifold 20 during that time period. The mass fraction of EGR in the intake manifold EGRf(K) may then be determined from ΔPegr(K), MAP(K) and MAT(K), and may be applied directly in a measurement of the cylinder inlet air rate, rather than relying on a correction value, such as that determined in the preferred embodiment, to correct for the influence of EGR on cylinder inlet air rate.

Of course, any inaccuracy in the determination of the mass fraction of EGR in the manifold may be compensated through the correction value, for example, due to error injected into the determination at the measurement or calculation stages. As was the case in the preferred embodiment, subject to the accuracy of the mass airflow rate measurement under steady state air dynamic conditions, the correction value provided in accord with this invention provides compensation for any deviation in a parameter away from a modelled or measured value that tends to impact the accuracy of the cylinder inlet air rate measurement may be compensated within the scope of this invention.

Figure 3:
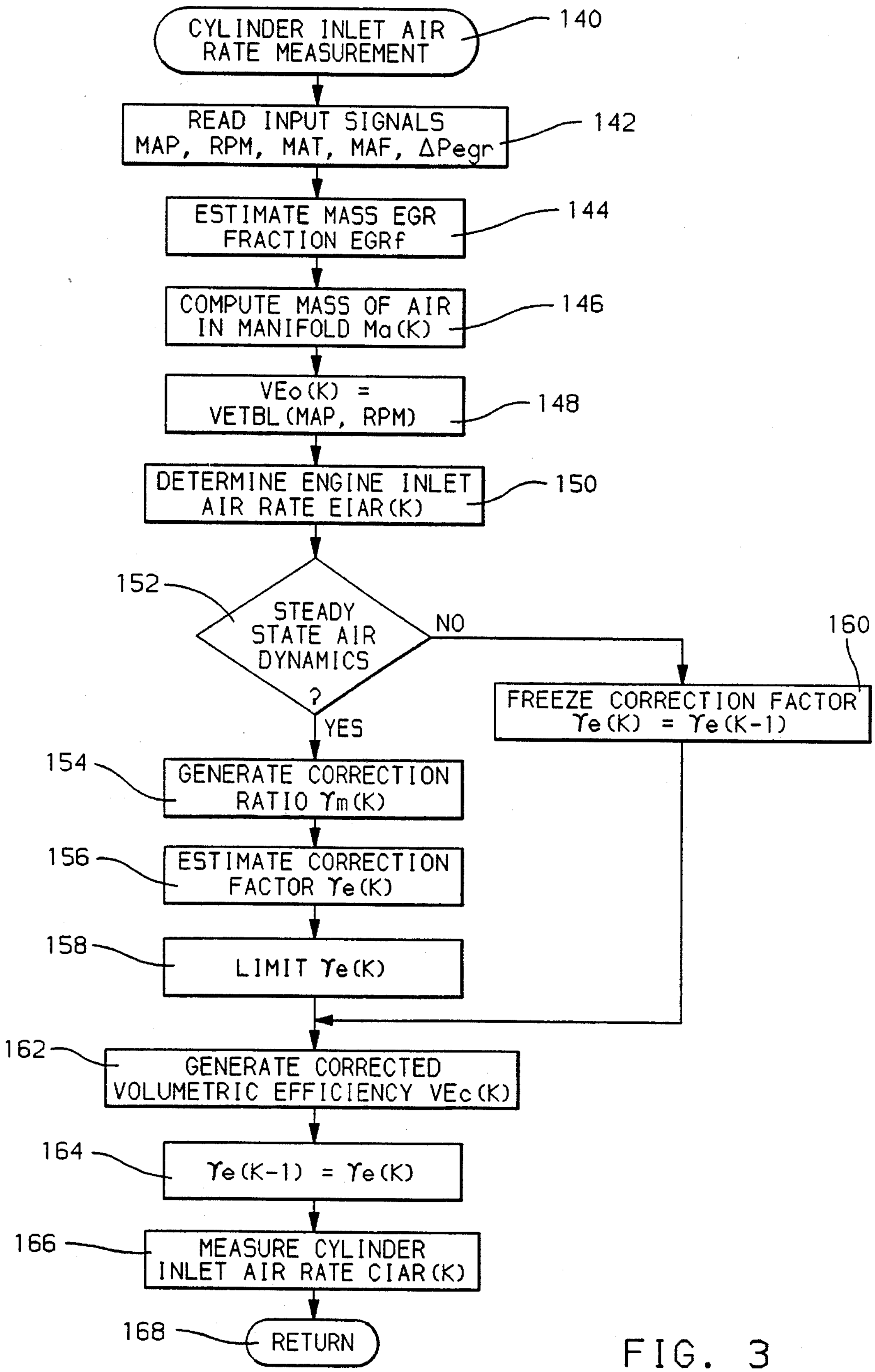

The steps used to carry out an alternative embodiment of this invention are illustrated in FIG. 3, which may be executed in a step-by-step manner by controller 28 (FIG. 1) at appropriate times when the controller 28 is operating, such as at the described step 110 of the incorporated reference. The measurement of cylinder inlet air rate at the step 110 of the incorporated reference may be provided through this alternative embodiment just as it could be provided through the described preferred embodiment.

Specifically, when step 110 of the incorporated reference requires measurement of cylinder inlet air rate, the routine of FIG. 3 may be executed, starting at a step 140, and moving to read input signals including those described in the preferred embodiment hereof and the described pressure difference signal ΔPegr(K) at a step 142. The routine then estimates the mass EGR fraction EGRf(K) in the engine intake manifold 20 (FIG. 1) as a generally-known predetermined function of ΔPegr(K) , MAT(K) , and MAP(K), at a step 144. Next, at a step 146, the mass of air Ma(K) in the engine intake manifold 20 (FIG. 1) is computed through application of the fundamental gas equation as follows $$Ma(K)=(1-EGRf(K))*(MAP(K)*(V/(R*MAT(K)))$$

in which V is a constant representing the volume of the engine intake manifold, and R is the universal gas constant.

Next, a nominal volumetric efficiency value VEo(K) is referenced from a calibrated volumetric efficiency table VETBL through reference parameters such as MAP(K) and RPM(K), at a step 148. The determination of the volumetric efficiency entries in VETBL may be carried out as described in the preferred embodiment hereof. After referencing VEo(K) from VETBL at the step 148, step 150 is executed to determine an engine inlet air rate EIAR(K), such as in the manner described in the preferred embodiment hereof at the step 76 of FIG. 2. The routine then moves to the step 152 to determine if the engine inlet air dynamics are in steady state. If not, the adjustment to the corrector term γe(K) is frozen at a step 160 in the manner described in the preferred embodiment, and if so, the corrector term is updated through the steps 154–158. Specifically, a correction ratio is generated at a step 154 as follows $$\gamma m(K)=EIAR(K)/(Ma(K)*VEo(K))$$

as the ratio of mass airflow meter-based cylinder inlet air rate to the nominal volumetric efficiency-based cylinder inlet air rate. The mass of air in the intake manifold Ma(K) is used in this embodiment to generate γm(K) so as to correct for the mass of EGR in the manifold directly. Accordingly, and unlike the preferred embodiment hereof, the correction of this embodiment is an air correction, not necessarily including information on the extent that EGR impacts the nominal volumetric efficiency VEo(K).

The routine then estimates the correction factor γe(K) at a step 156, and limits it at a step 158, both of which steps may be carried out as described in the preferred embodiment hereof. The correction factor γe(K), whether held constant at the step 160 or updated through the steps 154–158, is next applied at a step 162 to generate a corrected volumetric efficiency VEc(K). In this embodiment, the mass airflow sensor is used in the generation and updating of the correction factor γe(K), but is not used in the measurement of the cylinder inlet air rate CIAR(K) under steady state conditions, indicating the usefulness of the correction factor determined in accord with this invention. A desire for a simplified control strategy or the use of an inexpensive mass airflow sensor may make such use of mass airflow information desirable.

Returning to FIG. 3, the correction factor e(K) is then stored as γe(K−1) at a step 164. Finally, cylinder inlet air rate CIAR(K) is measured at a step 166 using the corrected volumetric efficiency value, such as in the manner described at the step 94 of FIG. 2. The routine then returns to prior operations via the step 168.

The inventors intend that other parameters, such as vehicle altitude which may be derived from a barometric pressure sensor measurement may be measured and directly accounted for in the CIAR() determination, just as was done for the measured EGR quantity in this alternative embodiment. Furthermore, the calibration of the nominal volumetric efficiency table VETBL may be varied or made more complex by varying or adding parameters to the generation of the table, such as EGR quantity, altitude, or manifold air temperature. The correction provided in accord with this invention should not be limited to operation with a specific calibration, or to correction for a specific set or class of effects, as the highly reliable mass airflow information under steady state conditions may be used in combination with a wide variety of parameters to correct for virtually any unmodelled effect that operates to degrade calibrated volumetric efficiency accuracy.

The preferred embodiment for the purpose of explaining this invention is not to be taken as limiting or restricting the invention since many modifications may be made through the exercise of skill in the art without departing from the scope of the invention.

The embodiments of the invention in which a property or privilege is claimed are described as follows:

1. A method for generating a correction factor for correcting an internal combustion engine cylinder inlet air rate estimation, comprising the steps of:

sensing engine inlet air rate;

diagnosing a steady state condition of the engine, by (a) sensing a value of a predetermined engine parameter indicative of engine intake manifold filling and depletion, (b) comparing the sensed value to a predetermined threshold value, and (c) diagnosing the steady state condition of the engine when the sensed value does not exceed the predetermined threshold value;

estimating cylinder inlet air rate when the steady state condition is diagnosed;

generating a value representing a deviation of the estimated cylinder inlet air rate away from the sensed engine inlet air rate when the steady state condition is diagnosed; and generating a correction factor for correcting the internal combustion engine cylinder inlet air rate estimation as a predetermined function of the generated value.

2. The method of claim 1, wherein the predetermined parameter corresponds to engine intake manifold air pressure.

3. The method of claim 1, wherein the sensed value corresponds to a rate of change.

4. A method for generating a correction factor for correcting an internal combustion engine cylinder inlet air rate estimation, comprising the steps of:

sensing engine inlet air rate;

diagnosing a steady state condition of the engine;

estimating cylinder inlet air rate when the steady state condition is diagnosed, by (a) generating a nominal volumetric efficiency value, (b) sensing predetermined engine parameters, and (c) estimating engine cylinder inlet air rate as a predetermined function of the generated volumetric efficiency and the sensed predetermined engine parameters; generating a value representing a deviation of the estimated cylinder inlet air rate away from the sensed engine inlet air rate when the steady state condition is diagnosed; and generating a correction factor for correcting the internal combustion engine cylinder inlet air rate estimation as a predetermined function of the generated value.

5. The method of claim 4, wherein the predetermined engine parameters include engine intake manifold pressure and engine intake air temperature.

6. A method for measuring internal combustion engine cylinder inlet air rate, comprising the steps of:

sensing a predetermined set of engine parameters;

determining a nominal volumetric efficiency value as a predetermined function of the predetermined set of engine parameters;

sensing engine inlet air rate;

sensing a presence of a steady state engine intake air dynamic condition;

determining a correction factor when the steady state engine intake air dynamic condition is sensed to be present, by (a) generating a value representing engine cylinder inlet air rate, (b) calculating a deviation value indicating the degree of deviation of the generated value away from the sensed engine inlet air rate, and (c) determining the correction factor as a predetermined function of the calculated deviation value;

correcting the nominal volumetric efficiency value when the steady state engine intake air condition is not sensed to be present by applying the correction factor to the nominal volumetric efficiency value; and measuring the engine cylinder inlet air rate as a predetermined function of the corrected nominal volumetric efficiency value.

7. The method of claim 6, wherein the step of sensing a presence of a steady state engine intake air dynamic condition further comprises the steps of;

sensing a parameter indicating a degree of change in air volume in an engine intake manifold;

comparing the sensed parameter to a predetermined threshold value; and sensing the presence of the steady state air dynamic condition when the sensed parameter does not exceed the predetermined threshold value.

8. The method of claim 6, wherein the predetermined set of engine parameters includes engine intake manifold pressure and engine speed.

* * * * *